United States Patent
Kompanets et al.

(10) Patent No.: US 9,532,037 B2
(45) Date of Patent: Dec. 27, 2016

(54) FAST-ACTING LOW VOLTAGE LIQUID CRYSTAL STEREO GLASSES

(71) Applicants: Igor Nikolaevich Kompanets, Moscow (RU); Aleksandr Lvovich Andreev, Moscow (RU); Vasiliy Aleksandrovich Ezhov, Moscow (RU); Aleksandr Georgievich Sobolev, Moscow (RU)

(72) Inventors: Igor Nikolaevich Kompanets, Moscow (RU); Aleksandr Lvovich Andreev, Moscow (RU); Vasiliy Aleksandrovich Ezhov, Moscow (RU); Aleksandr Georgievich Sobolev, Moscow (RU)

(73) Assignees: Igor Nikolaevich Kompanets, Moscow (RU); Aleksandr Lvovich Andreev, Moscow (RU); Vasiliy Aleksandrovich Ezhov, Moscow (RU); Alrksandr Georgievich Sobolev, Moscow (RU)

( * ) Notice: Subject to any disclaimer, the term of this patent is extended or adjusted under 35 U.S.C. 154(b) by 0 days.

(21) Appl. No.: 14/439,047

(22) PCT Filed: Nov. 13, 2013

(86) PCT No.: PCT/RU2013/001011
§ 371 (c)(1),
(2) Date: Apr. 28, 2015

(87) PCT Pub. No.: WO2014/077737
PCT Pub. Date: May 22, 2014

(65) Prior Publication Data
US 2015/0304643 A1    Oct. 22, 2015

(30) Foreign Application Priority Data

Nov. 13, 2012   (RU) .................. 2012147959

(51) Int. Cl.
*H04N 13/04*    (2006.01)
*G02F 1/141*    (2006.01)
*G02B 27/22*    (2006.01)

(52) U.S. Cl.
CPC ...... *H04N 13/0438* (2013.01); *G02B 27/2264* (2013.01); *G02F 1/141* (2013.01); *H04N 13/0434* (2013.01); *H04N 2213/008* (2013.01)

(58) Field of Classification Search
None
See application file for complete search history.

(56) References Cited

U.S. PATENT DOCUMENTS

2012/0033184 A1\*  2/2012  Tanaka ............... G02B 27/26 353/8
2013/0201416 A1\*  8/2013  Kim .................. G02F 1/1313 349/15

FOREIGN PATENT DOCUMENTS

WO    2011/125462    \* 11/2011

\* cited by examiner

*Primary Examiner* — Ashok Patel
(74) *Attorney, Agent, or Firm* — Paul & Paul

(57) ABSTRACT

The invention relates to the field of optoelectronics and display technology and can be used in high speed stereoscopic glasses when working with any type of 3D display, designed to operate with active stereo glasses with standard (60-160 Hz), high (hundreds of Hz) and ultrahigh (several kilohertz) frame rate. According to the invention in optical shutters of high-speed stereo glasses a layer of the helix-free ferroelectric liquid crystal (FLC) with optimized physical parameters is used. The technical result is an increase of the optical contrast of FLC shutters, reducing the amplitude of the control voltage.

3 Claims, 6 Drawing Sheets

FAST-ACTING LOW VOLTAGE LIQUID CRYSTAL STEREO GLASSES

CROSS-REFERENCE TO RELATED APPLICATIONS

This application is a 371 national stage application of International Application PCT/RU2013/001011, filed Nov. 13, 2013, and claims the priority of Russian Application No. 2012147959, filed on Nov. 13, 2012.

BACKGROUND OF THE INVENTION

1. Field of the Invention

The invention relates to the field of optoelectronics and display technology and can be used in high-speed stereoscopic glasses when working with any type of 3D display, designed to operate with active stereo glasses with standard (60-160 Hz), high (hundreds of Hz) and ultrahigh (several kilohertz) frame rate.

The invention relates to the field of three-dimensional (3D) displays, more particularly to stereoscopic displays, and can be used to create liquid crystal (LC) stereo glasses that provide high quality of stereo images when working with various relevant 3D displays at standard (60-160 Hz), high (hundreds Hz) and ultra-high (up to several kHz) frame rates.

2. Brief Description of Related Art

The main advantage of 3D stereoscopic displays using active stereoscopic glasses (hereinafter—"stereo glasses") is full-screen resolution in an observed stereo image, in each of two foreshortenings (observation angles) of 3D scene that are alternately reproduced on a screen, with no restrictions as to the number of observers, as well as to their position relative to a screen, that is yet unattainable for almost all types of existing glasses-free (auto stereoscopic) displays.

Liquid crystal (LC) stereo glasses [1] with two active optical shutters based on a nematic liquid crystal (NLC) are well known. Optical NLC shutters of stereo glasses are alternately switched between the states "open" and "closed" under the action of control signals of an electronic controller, which receives the output signal of a decoder of sync signals derived from a receiver of sync signals. A source of sync signals is a transmitter of sync signals, which is built-in 3D display, or an external transmitter, associated with a 3D display on the information channel. Sync signals carry the information about the moments of mutual change of two images (left and right) of foreshortenings of 3D scene on 3D display screen.

Known stereo glasses with optical NLC shutters do not provide a high frame rate and a small duration of playback of foreshortenings of images, and thus a high quality of a stereo image. Indeed, to prevent a flicker at viewing a wide stereo image (either conventional stereo image at the presence of a stray light in the lateral field of the observer vision), the frame rate of stereo images should be not less than 140-200 Hz (depending on the intensity of the lateral light), due to the increased sensitivity of the peripheral part of vision to the light flicker. In conventional stereo glasses the stray light (crosstalk) of NLC shutter takes place for 2-2.5 ms that equals to the relaxation time of NLC layer [2] in a nearby shutter after switching off (zeroing) the control voltage on it. Since at the considered frame rate the time of presentation of every foreshortening is about 5-7 ms, then on the boundary between frames the parasitic gradient of image brightness occurs, which occupies about 25-30% of the frame square and corresponds to changing the magnitude of NLC shutter transmission during indicated relaxation time. To avoid a crosstalk in LC computer monitors as a part of 3D laptops and desktop computers, working with nVidia graphics cards, the method [3] of playing foreshortenings at the very end of each frame became widespread, for the time of 2 ms at 100-120 Hz frame rate, when the main portion of the frame is used only for image scanning. At forming a stereoscopic image by such a method with using known stereo glasses based on NLC shutters the brightness of each frame of the observed stereo image decreases as a factor $1.5\pm2$ since during 2 ms of foreshortenings playback an each NLC shutter remains only partially open because of the relaxation time of 2-2.5 ms.

This means that not only at 140-200 Hz, but even at the standard frame frequency of 100-120 Hz, the stereo glasses with sufficiently steep fronts of the optical state switching (not worse than fractions of a millisecond) are in demand to avoid a crosstalk between foreshortenings observed in stereo glasses at the duration 7.2 ms of the light flux of foreshortening images, as well as to prevent a strong diminish of the brightness of the entire frame of a stereo image or its part.

In addition, independent power supply in known stereo glasses with NLC shutters has to supply the voltage not less than 12-30 Volts (depending on the type of NLC structure) to provide the work of NLC shutters with sufficient contrast (with sufficient separation of foreshortenings) to avoid a noticeable crosstalk in stereo images.

The closest on the technical nature to the claimed device (prototype) is a fast low-voltage stereo glasses [4], containing a low-voltage power source, a receiver of sync signals, a decoder of sync signals, an electronic controller and two optical shutters with the helix ferroelectric liquid crystal (FLC), whose the first and second electrical inputs are connected respectively to the first and second outputs of an electronic controller, whose input is connected to the output of a decoder of sync signals, whose input is connected to the output of a receiver of sync signals, and the output of the low-voltage power source is connected to the supply terminals of a receiver of sync signals, of a decoder of sync signals and of an electronic controller.

Known high-speed low-voltage stereo glasses allow to observe stereo images without the brightness gradient or decreasing the overall brightness of observed foreshortenings at frame rates up to several kHz, corresponding to the limit frequency of switching of optical shutters based on helix FLC, and the amplitude of bipolar control voltage pulses for these shutters is $\pm 3V$.

However, when known high-speed stereo glasses are used the quality of stereo image is reduced due to the scattering of light in a layer of helix FLC because of its non-optimal physical parameters selected without taking into account the specific timing parameters of frames with foreshortenings. The reason is that the control electric field generally causes FLC helix deformation that is sufficient to form ferroelectric domains, which could become centers of $\pm$polarization of helix FLC. The presence of light scattering centers results in FLC partial depolarization and corresponding diminishing the optical contrast of optical shutters with helix FLC, i.e. reducing the quality of stereo images. The higher the frame rate and shorter the time of foreshortenings playback, the more the probability of arising (density) of scattering centers and the greater their influence on the decline of the quality of stereo images.

Negative influence of scattering centers on the quality of stereo images is minimized by means of careful selection of the physical parameters of helix FLC layer for the specific frame rate and duration of playback of stereo image foreshortenings. However, for a work with arbitrary timing parameters of playback of stereo image foreshortenings it is difficult to provide the absence of scattering centers in a helix FLC layer of the optical shutter with fixed physical parameters, i.e. there are problems to obtain the equally high quality of observed stereo images in the known high-speed stereo glasses in the case of a work with different relevant 3D displays, characterized by different frame rates and variable duration of foreshortenings playback.

Since the known high speed stereo glasses are optimal only for a specific type of relevant 3D displays with specific timing parameters of foreshortenings playback, therefore a decoder of sync signals is designed for only one protocol (one logical form) of sync signals.

SUMMARY OF THE INVENTION

The object of the invention is to improve the quality of stereo images for any timing parameters of foreshortenings playback, when stereo glasses work with any relevant 3D display.

According to the invention in optical shutters of high-speed stereo glasses a layer of the helix-free ferroelectric liquid crystal (FLC) with optimized physical parameters is used. The technical result is an increase of the optical contrast of FLC shutters, reducing the amplitude of the control voltage (2 positions of the patent formula, 6 illustrations).

The task in high-speed low-voltage liquid crystal stereo glasses containing a low-voltage power source, a receiver of sync signals, a decoder of sync signals, an electronic controller and two FLC shutters, whose first and second electrical inputs are connected to the first and second outputs of an electronic controller, whose input is connected to the output of a decoder of sync signals, whose input is connected to the output of a receiver of sync signals, and the output of the low-voltage battery is connected to the supply terminals of a receiver of sync signals, a decoder of sync signals and an electronic controller, is solved in that the FLC is selected with helix-free and satisfying to the condition $q_0 = 2\pi/p_0 \to 0$, where $q_0$—wave vector of a helix and $p_0$—a helix pitch, and the value $\gamma_\phi$ of rotational viscosity for helix-free FLC is selected within a range of $0.3 < \gamma_\phi < 1.0$ Poise, the value of spontaneous polarization $P_s$ is not more than 50 nC/cm$^2$, and the modulus of elasticity K, determining the spatial periodic deformation of FLC director along smectic layers of helix-free FLC is in the range $(1 \div 3) \times 10^{-12}$ Newtons, while the limit operation frequency of a receiver of sync signals, a decoder of sync signals and of an electronic controller is chosen not below than the limit frequency of switching of optical shutters with helix-free FLC.

Improving the quality of stereo images is provided by the achievement of the first technical result—increasing the optical contrast of FLC shutters. Increasing the optical contrast is due to the lack of ferroelectric domains in helix-free FLC layer that are capable to scatter the light, that, in turn, is due to, firstly, the absence of a helix (i.e., FLC initial deformation promoting arising the ferroelectric domains), and secondly, significant decreasing the value of spontaneous polarization in the helix-free FLC layer that can cause the appearance of ferroelectric domains.

The second technical result is decreasing the amplitude of the control voltage down to ±1.5 V for optical shutters based on helix-free FLC. Both technical results are interrelated since decreasing almost half the value of the control voltage also contributes to the lack of deformations (induced by the electric field) of the helix-free FLC director, which could result in arising the ferroelectric domains and light scattering.

The reduction of the control voltage in optical shutters also results in significant improving the energy efficiency of stereo glasses, because the power consumption is mainly determined by the electric power consumed by optical shutters, when they are switched, and this power is proportional to the square of the switching voltage.

In a particular embodiment of optical shutters implementation the thickness of helix-free FLC layer is in the range 1.3÷1.8 µm that provides achromatic (without notable color distortion) stereo images. Helicoidal twisting of the director in FLC layer volume was suppressed (compensated) due to the interaction of chiral (optically active) additions with opposite signs of optical activity.

In a particular embodiment of implementation of the device with the multispectral multiprotocol transceiver the solution of the task of invention is provided, when stereo glasses can work with any relevant 3D display, because only such a work allows to realize technically the playback with arbitrary timing parameters of foreshortenings that is typical for various types of relevant 3D displays with sync signals of different protocols and physical forms.

DETAILED DESCRIPTION

Figure 1:
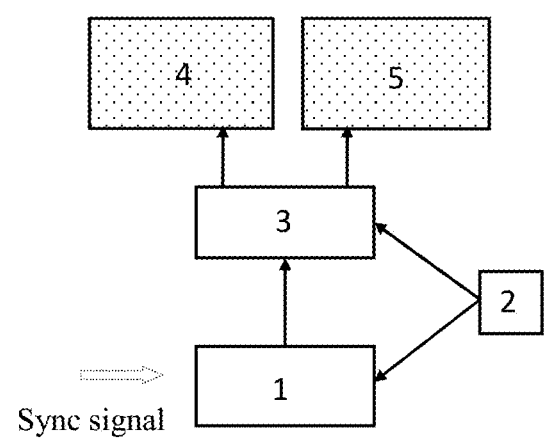
FIG. 1—general block diagram of stereo glasses.
Figure 2:
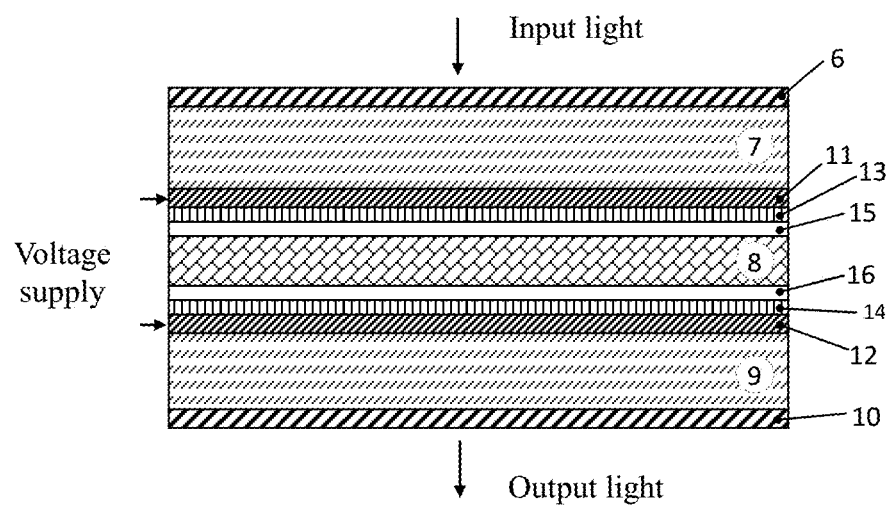
FIG. 2—cross-section of an optical shutter of stereo glasses.

Fast, low-voltage liquid crystal stereo glasses (FIG. 1) contain a low voltage power source 1, a receiving-decoding unit 2, consisting of a receiver 2-1 of sync signals and a decoder 2-2 of sync signals, an electronic controller 3 and two optical shutters 4 and 5 with the helix-free FLC, whose the first and second electrical inputs are connected to the first and second outputs of an electronic controller 3, whose input is connected to the output of a receiving-decoding unit 2 of sync signals, and the output of a low voltage power source 1 is connected to the power terminals of a receiving-decoding unit 2 of sync signals and an electronic controller 3, wherein each of optical shutters 4, 5 consists of (FIG. 2) sequentially optically connected the first linear polarizer 6, the first transparent dielectric plate 7, a FLC layer 8, the second transparent dielectric plate 9 and the second linear polarizer 10, and on the inner surfaces of the first and second transparent dielectric plates 7 and 9 the first and second transparent electrodes 11 and 12 are deposited, on which the transparent dielectric coatings 13 and 14 are deposited, over at least one of which an orienting anisotropic transparent coating 15 and/or 16 is deposited. Besides, the physical parameters of helix-free FLC layer 8 are selected as follows:

The wave vector $q_0=0$ tends to zero ($q_0 \to 0$), and $q_0=2\pi/p_0$, where $p_0$—pitch of a helix;

The value of rotational viscosity satisfies $0.3 < \gamma_\phi < 1.0$ Poise;

The spontaneous polarization $P_s \leq 50$ nC/cm$^2$;

The value of elastic modulus K, determining the spatial periodic deformation of the helix-free FLC director along smectic layers, is in the range $(1 \div 3) \times 10^{-12}$N.

We also believe that limit frequencies of switching of a receiving-decoding unit 2 and an electronic controller 3 are not less at least than limit frequencies of switching of each of optical shutters 4, 5 with the helix-free FLC.

Figure 3:
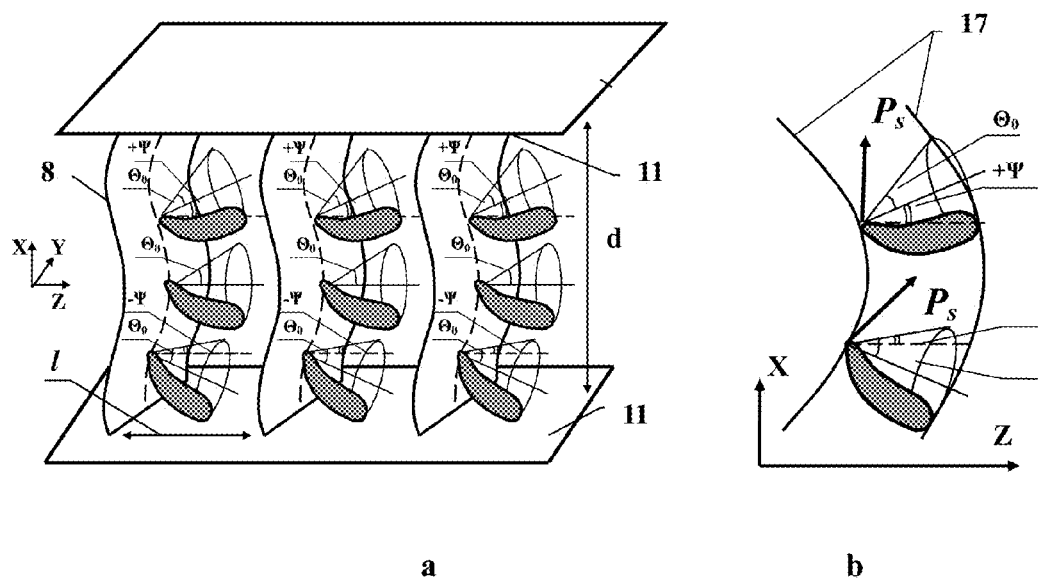
FIG. 3—structure of the layer of helix-free FLC with planar orientation of the director and the spatial periodic deformation of smectic layers: a—a general picture, and b—a structure fragment.
Figure 4:
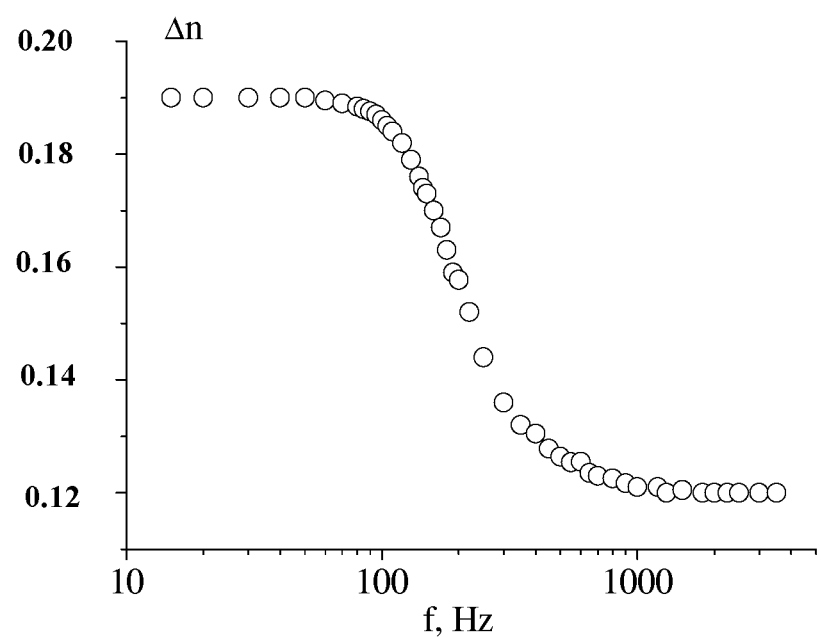
FIG. 4—a graph of the frequency dependence of the helix-free FLC birefringence.

When these physical parameters of the layer 8 of the helix-free FLC take place, then in the absence of the external control electric field the space charge generated by the spontaneous polarization is compensated, and a spatially periodic deformation of the director of the helix-free FLC is appeared with a period of 1 along smectic layers 17 (FIG. 3), where $\Theta_0$—tilt angle of molecules in smectic layers 17, $\Psi$—bending angle of each of smectic layers 17, $P_s$—spontaneous polarization vector, d—thickness of the helix-free FLC. In the presence of the control electric field the periodic deformations of the director of the helix-free FLC serve as the physical cause of changing the layer birefringence $\Delta n$ of the helix-free FLC and its characteristic dependence on the field frequency (FIG. 4). Thereby the helix-free FLC differ from helix FLC, in which the birefringence change $\Delta n$ is associated with the helix deformation (without changing its pitch) in the electric field. The presence of spatial periodic deformations of the director of the helix-free FLC along smectic layers 17 means that FLC molecules in smectic layers 17, initially inclined at an angle $\Theta_0$ with respect to the normal to the layer 8 at some point, are deviated additionally at the angle $\Psi$ relative to the axis z, and, accordingly the projection of FLC director on the xy plane changes. The interaction of the alternating electric field E applied along the x-coordinate, with the spontaneous polarization Ps changes the distribution of the angle $\Psi$ characterizing the spatial periodic deformations of the director of the helix-free FLC along smectic layers 17.

Physically, this means also changing the type of energy dissipation and the transition (in terms of the characteristics of dissipation) of the rotational viscosity $\gamma_\phi$ to the shear viscosity $\gamma_\Psi$. The development of this process of interaction of the electric field with a layer of the helix-free FLC in time results in the appearance of a train of solitons [5], which is a wave packet with a periodic wave localized in it. If the value of the rotational viscosity $\gamma_\phi$ is chosen below 0.3 Poise, then at increasing the frequency of switching the optical state of the layer 8 of the helix-free FLC the shear viscosity $\gamma_\Psi$ is not reached, and the soliton mechanism of the orientation of FLC director is not realized. For $\gamma_\phi > 1.0$ Poise the optical response time of the layer of the helix-free FLC increases significantly not only on small, but also on high switching frequencies, when the shear viscosity $\gamma_\Psi$ becomes responsible for the energy dissipation. Increasing the value of the spontaneous polarization $P_s$ above 50 nC/cm2 increases the saturation voltage and, therefore, increases the operating voltage of FLC shutter. Finally, the range of $(1 \div 3) \times 10^{-12}$ Newtons for the modulus K characterizes the interval, in which smectic layers 17 are stable on the one hand, and the other hand they are ductile to the formation of periodic spatial deformations of the director of the helix-free FLC in the absence of an electric field.

In a particular device embodiment, the layer thickness of the helix-free FLC in each of the optical shutters 3, 4 is within the range of $1.3 \div 1.8$ μm. A specific example of implementing the low-voltage power source 1 is a single silver-zinc tablet with the voltage of about 1.5 V.

Figure 5:
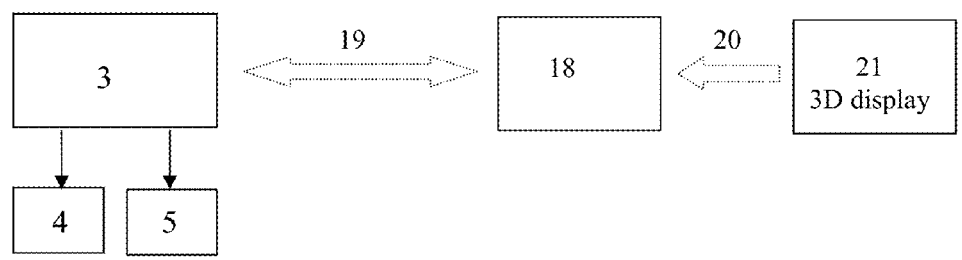
FIG. 5—block diagram of stereo glasses with autonomous multispectral and multiprotocol transceiver of sync signals.

In a particular device embodiment, a multispectral receiver of sync signals 2-1 and a decoder of sync signals 2-2 are implemented as an autonomous transceiver of sync signals 18 (FIG. 5), whose output is the output of a decoder of sync signals 2-2, coupled to an input of an electronic controller 3 by means of the two-way wireless communication link 19, wherein the limit frequency of information transmission on the two-way communication link 19 is not less than the limit frequency of switching of optical shutters 4, 5 with the helix-free FLC. An input of an autonomous transceiver 18 is coupled to the output of a transmitter of sync signals that is informationally associated with 3D display 21 due to the multispectral information channel 20. The two-way communication channel 19 is one-spectral and single-protocol channel.

The device operates as follows. A sync signal with any information protocol and any physical form of realization (IR-signal, radio-signal or a sync signal in visible light) obtained from any relevant 3D display enters to the input of a receiving-decoding unit of sync signals 2, which amplifies and decodes them to obtain a logical signal of changing the optical state in shutters 4, 5, which enters to the input of an electronic controller 3, which generates the control voltage for the optical shutters 4, 5, and the left shutter 4 and the right shutter 5 open in the process of image scanning on 3D display screen, accordingly for the left and right foreshortenings of the displayed 3D scene. The viewer equipped with stereo glasses, alternately by the left and right eyes observes the left and right foreshortenings respectively that due to binocular properties of vision leads to the perception of the volumetric (stereoscopic) image in observed 3D scene.

Figure 6:
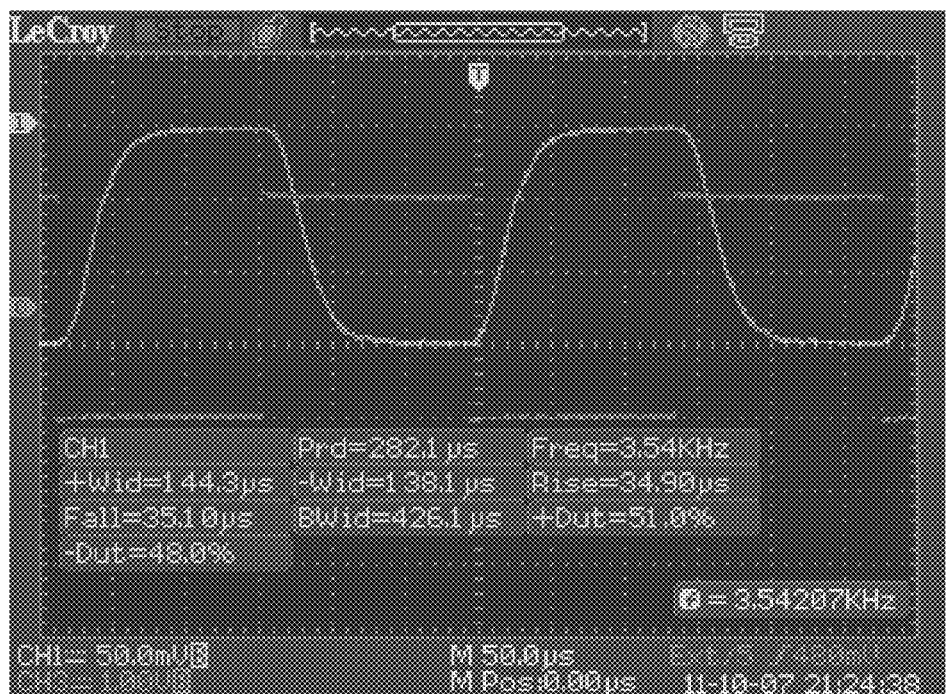
FIG. 6—oscillogram of the electro-optical response of an optical shutter based on helix-free FLC.

In FIG. 6 the oscillogram is presented, which shows the optical response (smoothed pulses, a zero is on the line 1) for a shutter 4 or 5 based on the helix-free FLC to the control electric voltage in the form of an sign-alternating meander (rectangular wave pulses, a zero is on the line 3, a value of a large vertical scale is 1 V) with the amplitude ±1.5 and the frequency of 3542 Hz. In this considered example of particular implementation of an optical shutter 4 or 5, a dielectric coating is deposited on a one substrate, and FLC layer thickness d is 1.7 μm. The upper level of the optical response is a closed state of a shutter 4 or 5, the bottom level—the open state. It can be seen that the time $\tau_{0.1\text{-}0.9}$ on the front edge (Rise) equals to 34.9 μs and on the falling edge (Fall)—35.1 μs. In comparison with the similar response of an optical shutter based on the helix FLC [4] a transient time in the optical shutter 4, 5 with the helix-free FLC decreases by 15-20 μs for both polarities of the applied voltage, and optical contrast increases by about 50%.

As a result, high-speed stereo glasses with optical shutters based on the helix-free FLC in considered specific embodiment is characterized by a 50% increased contrast (separation of foreshortenings), transient switching time of 35 μs and limit switching frequency of 3.5 kHz at the bipolar control voltage of ±1.5 V.

Thereby the improvement is achieved in the quality of stereo images (because of increasing a contrast due to eliminating the light scattering and because of decreasing a crosstalk due to a short transient time of switching the optical states), in improving of the speed due to increasing the limit frequency of switching the optical switches 4, 5 with the helix-free FLC, as well as in improving the energy efficiency due to halving the supply voltage (this corresponds to a reduction 4 times of power consumption in stereo glasses at the limit switching frequency).

In a particular embodiment of the device the power supply of stereo glasses, including electronics of controlling the optical shutters 3, 4, is carried out directly from a single silver-zinc battery of a voltage ±1.55 V, characterized by stable voltage until the end of the discharge, and which in the case of minimum capacity (for example, for type SR63) is several times smaller volume compared to 3V lithium battery CR2032, used traditionally to power the stereo glasses that minimizes the overall dimensions of stereo glasses.

In particular embodiment of the device operation (FIG. 5) in an autonomous transceiver 18 of sync signals both a working spectral frequency (preferably, within the spectral range of the visible, IR and RF radiation) and the protocol of receiving a sync signal are switched automatically due to electronic adaptation of an autonomous transceiver 18 of sync signals to according with parameters of a sync signal of specific 3D display. On bilateral communication channel 19 (for example, using RF radiation) from an autonomous transceiver 18 to an electronic controller 3 a signal enters for controlling the optical shutters 4, 5 of stereo glasses (the same protocol and the spectrum of sync signals for all copies of simultaneously operating stereo glasses). In turn, from an electronic controller 3 of each pair of stereo glasses to the general autonomous transceiver 18 an information is periodically transmitted, for example, the information about the current voltage of a low-voltage power source 1 of each copy of stereo glasses. This allows in the display of an autonomous transceiver 18 to monitor simultaneously the current power supply voltage in each copy of stereo glasses in order to provide a constant parallel remote control of power efficiency for all stereo glasses.

INDUSTRIAL APPLICABILITY

Low-voltage high-speed liquid crystal stereo glasses with optical shutters based on the helix-free FLC are characterized by:

Record high (compared to any known stereo glasses) switching frequency of 3.5 kHz, allowing to work in a wide range of frame rates of stereo images;

High contrast due to the lack of parasitic light scattering;

Wide angle field of view due to a small thickness of FLC layer (due to a small parasitic phase shift for all directions of view that are different from the normal to FLC layer;

Low supply voltage ±1.5 V and low power consumption;

Operating temperature range corresponding to normal operating conditions,

The similarity of manufacturing technology of optical shutters based on helix-free FLC with a well-established technology of manufacturing NLC shutters.

High-speed, low-voltage stereo glasses with optical shutters on the base of the helix-free FLC allow, for example, more than one and half times to increase the brightness of observed stereo images compared with the stereo glasses 3D Vision of nVidia production if to use the computer 3D monitor as a source of images in a regime of the playback of foreshortenings at the end of a frame for 2 ms [3]. In high-speed stereo glasses with optical shutters based on the helix-free FLC each of shutters is fully open during all time of the playback of foreshortenings providing the maximum brightness of observed stereo images, and is fully closed out this time providing equally high degree of separation of foreshortenings (without crosstalk) over all the image field.

Besides, fast stereo glasses with an autonomous multispectral multiprotocol transceiver operate automatically with any relevant 3D displays, for example, 3D video projectors according with the protocol DLP-Link of a sync signal transmitted in the image light flux in the visible spectrum of radiation, or from 3D LC TVs of Sony production, series KDL with the sync signal via infrared channel, or from 3D plasma TVs of Panasonic production, series TX with the sync signal via RF channel.

LITERATURE

1. B. MacNaughton, D. W. Alien, R. W. Kimmell. System for controlling the operation of a pair of 3D glasses having left and right liquid crystal viewing shutters. —U.S. Pat. No. 8,233,103, publication 31 Jul. 2012.
2. Deng-Ke Yang, Shin-Tson Wu. Fundamentals of liquid crystal devices. —John Wiley and Sons, 2006, pp. 199-242.
3. G. Slavenburg, T. Fox, J. D. Cook. System, method and computer program product for controlling stereo glasses shutters. —U.S. Pat. No. 7,724,211, publication 25 May 2010.
4. A. L. Andreev, V. A. Ezhov, I. N. Kompanets, A. G. Sobolev. Active liquid crystals 3D glasses. PCT/RU2011/000147, Patent RU 2456649, priority 29 Nov. 2010.
5. T. B. Fedosenkova, A. L. Andreev, E. P. Pozhidaev, I. N. Kompanets. Birefringence controlled by external electric field in helix-free ferroelectric liquid crystals. Bulletin of the Lebedev Physical Institute, #3, pp. 45-52 (2002).

The invention claimed is:

1. High-speed, low-voltage liquid crystal stereo glasses containing a low-voltage power source, a receiver of sync signals, a decoder of sync signals, an electronic controller and two optical shutters based on the ferroelectric liquid crystal, whose the first and second inputs are electrically connected to the first and second outputs of an electronic controller, whose input is connected to the output of an decoder of sync signals, whose the output is connected to the input of the receiver of sync signals, and the output of the low voltage power source is connected to the supply terminals of a receiver of sync signals, a decoder of sync signals and an electronic controller, wherein each of the optical shutters is implemented in the form of sequentially optically connected the first linear polarizer, the first transparent dielectric plate, a layer of ferroelectric liquid crystal, the second transparent dielectric plate and the second linear polarizer, on the inner side of the first and the second transparent dielectric plates the first and the second transparent electrodes are deposited, on which respectively the first and the second transparent dielectric coatings are deposited, over at least one of which the transparent orienting anisotropic coating is deposited, and the ferroelectric liquid crystal layer is applied with a possibility to electrically induce changes of its optical anisotropy, characterized in that a layer of the ferroelectric liquid crystal is selected helix-free and satisfying the condition $q_0 \to 0$, where $q_0$—wave vector of a helix, and $q_0 = 2\pi/p_0$, where $p_0$—a helix pitch, while a value of the rotational viscosity for the helix-free ferroelectric liquid crystal is chosen within the range $0.3 < \gamma_\phi < 1.0$ Poise, a value of the spontaneous polarization $P_s$ does not exceed 50 nC/cm$^2$, a value of the modulus of elasticity K determining the spatial periodic deformation of the director of the helix-free ferroelectric liquid crystal along smectic layers is in the range $(1 \div 3) \times 10^{-12}$ Newtons, and wherein the limit operation frequency of a receiver of sync signals, of a decoder of sync signals and an electronic controller is not less than the limit frequency of switching the optical shutter with the helix-free ferroelectric liquid crystal.

2. The stereo glasses according to claim 1, characterized in that a receiver of sync signals and a decoder of sync signals are implemented in the form of an autonomous multispectral multiprotocol transceiver of sync signals, whose output is the output of a decoder of sync signals, connected by the bilateral wireless communication link to the input of an electronic controller, wherein the limit frequency of information transmission on the bilateral communication link is not less than the limit frequency of switching the optical shutters with the helix-free ferroelectric liquid crystal.

3. The stereo glasses according to claim 1, characterized in that the low-voltage power source is in the form of a single silver-zinc battery.

* * * * *